United States Patent
Gormley

(10) Patent No.: US 8,406,136 B2
(45) Date of Patent: Mar. 26, 2013

(54) SYSTEMS AND METHODS FOR HYBRID RATE LIMITING BASED ON DATA BIT COUNT AND DATA PACKET COUNT

(75) Inventor: Eamonn Gormley, Redmond, WA (US)

(73) Assignee: Eden Rock Communications, LLC, Bothell, WA (US)

( * ) Notice: Subject to any disclaimer, the term of this patent is extended or adjusted under 35 U.S.C. 154(b) by 246 days.

(21) Appl. No.: 12/756,154

(22) Filed: Apr. 7, 2010

(65) Prior Publication Data
US 2010/0260044 A1    Oct. 14, 2010

Related U.S. Application Data

(60) Provisional application No. 61/167,791, filed on Apr. 8, 2009.

(51) Int. Cl.
*H04L 12/26* (2006.01)
*H04L 12/56* (2006.01)
*G06F 15/16* (2006.01)

(52) U.S. Cl. ......... 370/235; 370/252; 370/412; 709/233

(58) Field of Classification Search ........................ None
See application file for complete search history.

(56) References Cited

U.S. PATENT DOCUMENTS

| 5,604,867 | A | 2/1997 | Harwood |
| 7,664,028 | B1* | 2/2010 | Gingras et al. ................. 370/235 |
| 2005/0060414 | A1* | 3/2005 | Phillips et al. ................. 709/227 |
| 2006/0268728 | A1 | 11/2006 | Mower et al. |
| 2008/0267205 | A1 | 10/2008 | Chen et al. |
| 2009/0080427 | A1 | 3/2009 | Kamata et al. |

OTHER PUBLICATIONS

International Search Report and Written Opinion for PCT/US2010/030306 filed on Apr. 7, 2010.

* cited by examiner

*Primary Examiner* — Clemence Han

(57) ABSTRACT

A networked computing system employing a hybrid rate-limiting scheme, including one or more service provider device(s) (SPD) and one or more subscriber computing device(s) (SCD), and a data communications network facilitating data communications amongst the networked SPD and SCD devices. A SPD may apply the hybrid rate-limiting scheme to data communications provided to a SCD, based on both data bit count and data packet count information. The rate-limiting scheme may include a dual token bucket algorithm that facilitates rate-limiting PDUs in a data transfer queue utilizing one token bucket for metering data bits and another token bucket for metering data packets. The hybrid rate-limiting scheme may also employ a triple token bucket algorithm that includes one token bucket for metering data bits related to payload only data, a separate token bucket for metering data bits related to total PDU data, and another token bucket for metering data packets.

20 Claims, 10 Drawing Sheets

SYSTEMS AND METHODS FOR HYBRID RATE LIMITING BASED ON DATA BIT COUNT AND DATA PACKET COUNT

CROSS REFERENCE TO RELATED APPLICATIONS

The present application claims the benefit of U.S. Provisional Application No. 61/167,791, filed Apr. 8, 2009.

FIELD OF THE INVENTION

The field of the present invention generally relates to systems and methods that facilitate rate-limiting of packet data communications at various network devices within a data communications network. In order to evaluate and rate-limit packet data communications, a network service provider may advantageously employ one or more specialized rate-limiting schemes to limit the maximum data throughput that a subscriber can obtain.

BACKGROUND OF THE INVENTION

Modern wireless and wireline data communications networks employ packet data processing and exchanges at various layers within digital data communication's Open System Interconnection Reference Model (the OSI model). As would be understood by those skilled in the art, the OSI Model is an abstraction that defines conceptual, layered communications and computer network protocol design. At its core, the OSI model divides a network's communication architecture into seven distinct components, which include the following layers (from top to bottom): Application, Presentation, Session, Transport, Network, Data-Link, and Physical Layers. Generally, a particular OSI layer provides services to the layer above it and additionally the same OSI layer also receives services from the layer below it. Depending on where a given layer resides within an OSI stack, there may or may not be a layer above or below it with which the layer exchanges services.

In the context of a layered protocol stack, a unit of data specified in a given layer is commonly referred to as a protocol data unit (PDU). The PDU typically includes both payload and overhead (i.e., header information) data. A PDU may be referred to by other terms, such as a frame, a packet, a segment, a message, and so on . . . . In order to facilitate network communications, layered protocol stacks must facilitate transfer of PDU data amongst different portions (e.g., both wireless and wireline portions) of a data communications network. At each protocol layer, header information exists that can comprise a variety of data transfer information. Header data size generally remains constant for a given protocol layer, but it can also be variable. As data is passed to lower layers of the protocol stack, additional header information, specific to that layer can be added to the PDU. As data is passed to upper layers of the protocol stack, header information that is not used by the upper layers is generally removed from the PDU.

A PDU header may contain crucial data transfer information as well as instructions about data being carried in a particular PDU's payload. This information and these instructions may include, but are not limited to: a destination address (e.g., an IP address where a PDU is being routed through or delivered to), an originating address (e.g., an IP address where a PDU came from), PDU size information, synchronization information that allows a PDU to be compatible within an existing network infrastructure, a PDU sequence number that identifies which PDU a current PDU pertains to in a sequence of PDUs, a PDU protocol (with networks that carry many different types of information, the PDU protocol may define what type of PDU is being transmitted: e-mail data, webpage data, streaming video data, image data, etc.), encryption security data (encapsulating security payload information), etc.

Each PDU payload of a particular data transmission typically has a fixed-size PDU header attached to it before it is sent over a network communications link in a distributed data communications network (e.g., combined as a data packet). The PDU header is subsequently removed from the PDU payload at the receiving end of the network communications link so that sequenced payload data can be reassembled at a receiving device. In general, a PDU header represents a fixed communication link overhead that is required to ensure that PDU payload data is correctly routed to its delivery destination.

In many data communications systems where data packets are transmitted and routed amongst various network service provider devices (SPDs) and various subscriber computing devices (SCDs), communications link throughput may be restricted by a number of data packets that can be processed by a receiving SCD per unit of time (e.g., packets processed per second). This condition may be particularly detrimental in cellular data communications networks, where receiving SCDs (e.g., cellular telephones) are often designed with low cost processors that may not be capable of processing a maximum number of packets that a originating transmitter and/or intermediary transmitter is capable of sending to it.

As would be understood by those skilled in the Art, link throughput is generally defined as a rate of successful data communications delivery over a particular network communication channel per unit of time. This throughput is usually measured in bits per second (bps) or alternately in data packets per second. Some SCDs may only be able to process data at a maximum link throughput as long as an average packet size for a particular data communication session is sufficiently large enough. In scenarios where an average packet size for a data communications session is too small, either a transmitter or a receiver device may not be able to process a stream of data that arrives too quickly, due to device capability. Disadvantageously, this may result in data being lost during transmission. This lost data may detrimentally affect communications quality, and in accordance with the characteristics of some IP protocols, lost data may need to be retransmitted. This can negatively impact present and future network communication efficiency. Required retransmission can also lead to network congestion, particularly during peak data communications periods in portions of a data communications network experiencing increased levels of network traffic.

By way of example, assume a receiving SCD in a wireless data packet communications system is capable of processing 2000 Internet Protocol (IP) packets per second. If each packet contains 1500 bytes of IP data, then the maximum number of bits per second that the receiver would be capable of receiving would be defined by the following formula:

$$2000 \text{ packets/sec} \times 1500 \text{ bytes/packet} \times 8 \text{ bits/byte} = 24 \text{ Mbits/sec}$$

In contrast, if each packet were to only contain 100 bytes of IP data (100 bytes/packet) then the maximum number of bits per second that the receiver would be capable of receiving would be defined by the following formula:

$$2000 \text{ packets/sec} \times 100 \text{ bytes/packet} \times 8 \text{ bits/byte} = 1.6 \text{ Mbits/sec}$$

In this scenario, a transmitting device and a corresponding communications link may be capable of facilitating data transfer at rates much greater than 1.6 Mbits/sec (e.g., at rates consistent with Gigabit Ethernet: 1000 Mbs, or at rates consistent with the 802.11n standard: 108 Mbps, etc.). When sending side data transfer rates exceed receiving side processing capability, particularly with certain communications protocols (e.g., such as TCP/IP), lost data can lead to a rapid slowdown in throughput. This detrimental scenario could potentially be avoided if data packets were sent at a rate that was more compatible with a receiver SCD's processing capabilities. Alternatively, if a "connectionless" protocol, such as User Datagram Protocol (UDP), is utilized to send packets from the transmitter to the receiver, the high packet rate could cause transmitter PDU queues or receiver PDU queues to overflow. In this overflow scenario, a SCD that receives data packets too quickly may have design deficiencies that cause the SCD to drop significant amounts of data or to experience a software failure, requiring a reset (a hard boot) of the receiver device.

As would be understood by those skilled in the Art, UDP is an IP protocol commonly used for many different types of popular Internet communications. Networked SCD applications can utilize UDP to send messages on an IP based network without requiring prior communications routines to set up special transmission channels or data paths. UDP uses a simple transmission model without requiring node handshaking for guaranteed reliability, data packet ordering, or data integrity. UDP may provide unreliable service and it may assume that error checking and correction is either unnecessary or performed at the computer application level, thereby allowing UDP to avoid significant overhead associated with processing at the network interface level. Time-sensitive applications often use UDP because dropping packets may be a preferred option, compared to waiting for delayed packets, which may not always be an option in a certain real-time streaming data transfer scenarios. A few common network applications that may utilize UDP include: streaming media applications utilizing IPTV, Voice over IP (VoIP), Trivial File Transfer Protocol (TFTP), as well as online gaming applications.

In line with the above examples, assume a data service provider offers a 5 Mbps data service plan to one or more SCDs that are each capable of receiving and processing up to 2000 packets per second. As long as an average packet size for a particular data communications session is greater than:

$$5 \text{Mbits/sec} \div (8 \text{ bits/byte} \times 2000 \text{ packets/sec}) = 312.5 \text{ bytes/packet}$$

The service should theoretically operate without significant data transfer problems, however, if the average packet size drops below the 312.5 bytes/packet threshold and the transmitting device (e.g., a SCD or a SPD) attempts to maintain a 5 Mbps throughput, then data packets may be dropped at the receiving SCD, even though the data rate in bits per second is below the 5 Mbps threshold.

Further, as would be understood by those skilled in the Art, with a constant PDU payload throughput on a particular network communications link, the total PDU throughput (including fixed-size PDU header data) depends on an average PDU payload size. By way of example, if an average PDU payload size decreases on a network communications link, while the PDU payload throughput remains constant, then an actual link throughput will increase in proportion to the decrease in the average PDU size. Likewise, if an average PDU payload size increases on a network communications link, while PDU payload throughput remains constant, then an actual link throughput will decrease in proportion to the increase in the average PDU size. Due to the fact that an actual link throughput can drastically change with respect to variations in average PDU payload size (as the average PDU payload size decreases, while PDU payload throughput and header data size remain constant), there may be scenarios where actual link throughput is negatively impacted due to the nature of data communications that result in a relatively small average PDU payload data size (e.g., if the average PDU payload size is less than a designated multiple of the PDU header size, such as ten times the PDU header size).

Modern service providers may employ rate-limiting schemes that limit the PDU payload throughput in vacuum of the various data types that are being transferred across network communications links within portions of a larger data communications network. Further, present day service level agreements may not account for total PDU throughput, based on both payload and header size information, when allocating network resource limits to subscribers via various predetermined data-rate plans. Considering how different data types can affect the relationship of an average payload size compared with an average or constant header size can be very important for network resource planning considerations. For example, in a case where communications of a particular data type (e.g., streaming media types such as video and gaming data) results in a small average payload size, in relation to a constant PDU header size, a total throughput consumed on a communications link is substantially larger than the throughput of the PDU payload data alone. This additional link throughput may be much larger than a service provider anticipated when they drafted their service level agreements for regional network subscribers. Accordingly, service providers should account for more than just user generated traffic represented by PDU payload throughput.

Short-sighted network traffic planning can ultimately lead to periods of network congestion (data transfer loads that burden network capacity and throughput) between links in a larger data communications network. These overload periods can degrade a service provider network's Quality of Service (QOS) as well as network service subscribers' collective Quality of Experience (QOE) within a particular network, especially during peak data transfer periods. Some negative effects of poor traffic planning can lead to adversely affected network QOS and QOE metrics, which may result in: queuing delay, data loss, as well as blocking of new and existing network connections for certain network subscribers.

It would be beneficial to have improved systems and methods utilizing hybrid rate-limiting schemes that allow service providers to advantageously compensate for traffic types and receiving device capabilities. This could be facilitated by employing one or more data bit count rate-limiting mechanisms in combination with a packet count rate-limiting mechanism. It would be beneficial if the data bit count based rate-limiting mechanism(s) accounted for both traffic generated by a user (PDU payload only data bits), in combination with necessary traffic generated by total PDU data bits (relating to combined PDU header and payload data bits). By contemplating and accounting for these factors, service providers can mitigate situations where a significant amount of data being transferred may be lost due to deficiencies associated with receiving device capability, where device failures may occur when data transmission rates exceed device processing power, and where small average payload size data would unnecessarily burden actual link throughput. It would further be desirable to improve network resource allocation by practically enforcing hybrid rate-limiting schemes and by contractually enforcing more robust service level agreements that could affect network bandwidth maximization for a wide range of network SCDs transferring a variety different data types across portions of a distributed data communications network.

SUMMARY OF THE INVENTION

This summary is provided to introduce (in a simplified form) a selection of concepts that are further described below in the Detailed Description. This summary is not intended to identify key features of the claimed subject matter, nor is it intended to be used as an aid in determining the scope of the claimed subject matter.

In overcoming the above disadvantages associated with prior Art rate-limiting schemes, the present invention discloses systems and methods for hybrid rate-limiting based on both data bit count and data packet count. In an embodiment, a networked computing system employing a hybrid rate-limiting scheme includes one or more service provider device(s) (SPD), one or more subscriber computing device(s) (SCD), and a data communications network facilitating data communications amongst all devices of the networked computing system. A SPD of the networked computing system may apply the hybrid rate-limiting scheme to data communications provided to a SCD, based on at least one data bit count and a data packet count.

In accordance with another aspect of the present invention, the hybrid rate-limiting scheme may facilitate rate-limiting based on a number of protocol data unit (PDU) data bits counted per unit of time.

In accordance with further aspect of the present invention, the hybrid rate-limiting scheme may also concurrently facilitate rate-limiting based on a number of data packets counted per unit of time, relating to the same data communications provided to the SCD.

In accordance with yet another aspect of the present invention, the hybrid rate-limiting scheme may also include a dual token bucket algorithm that facilitates rate-limiting PDUs in a data transfer queue utilizing a first token bucket component for metering data bits and a second token bucket component for metering data packets.

In accordance with yet a further aspect of the present invention, the dual token bucket algorithm may determine that when there are not enough data bit tokens in the first token bucket component or when there are not enough data packet tokens in the second token bucket component, to facilitate transfer of a next PDU in the data transfer queue, the next PDU is held in queue until sufficient tokens become available (e.g., when sufficient tokens independently become available in each of the first bucket component and the second bucket component).

In accordance with another aspect of the present invention, the hybrid rate-limiting scheme may also include a triple token bucket algorithm that may facilitate rate-limiting PDUs in a data transfer queue utilizing a first token bucket component for metering data bits related to payload only data, a second token bucket component for metering data bits related to total PDU data, and a third token bucket component for metering data packets.

In accordance with a further aspect of the present invention, the hybrid rate-limiting scheme may include a data bit threshold and data packet threshold that can be independently set, based on the determined capabilities of a SCD receiving the data communications.

In accordance with another aspect of the present invention, is a computer-readable medium encoded with computer-executable instructions having hybrid rate-limiting scheme instructions, which when executed, perform a method including the process(es) of applying a hybrid rate-limiting scheme to data communications provided to a subscriber computing device (SCD) by a service provider device (SPD) over a data communications network, based on one or more data bit count(s) and a data packet count.

In accordance with yet another aspect of the present invention, is a computer-implemented method employing a hybrid rate-limiting scheme, the method including the process(es) of applying a hybrid rate-limiting scheme to data communications provided to a subscriber computing device (SCD) by a service provider device (SPD) over a data communications network, based on one or more data bit count(s) and a data packet count.

BRIEF DESCRIPTION OF THE DRAWINGS

Preferred and alternative examples of the present invention are described in detail below with reference to the following Figure drawings.

DETAILED DESCRIPTION

Figure 1:
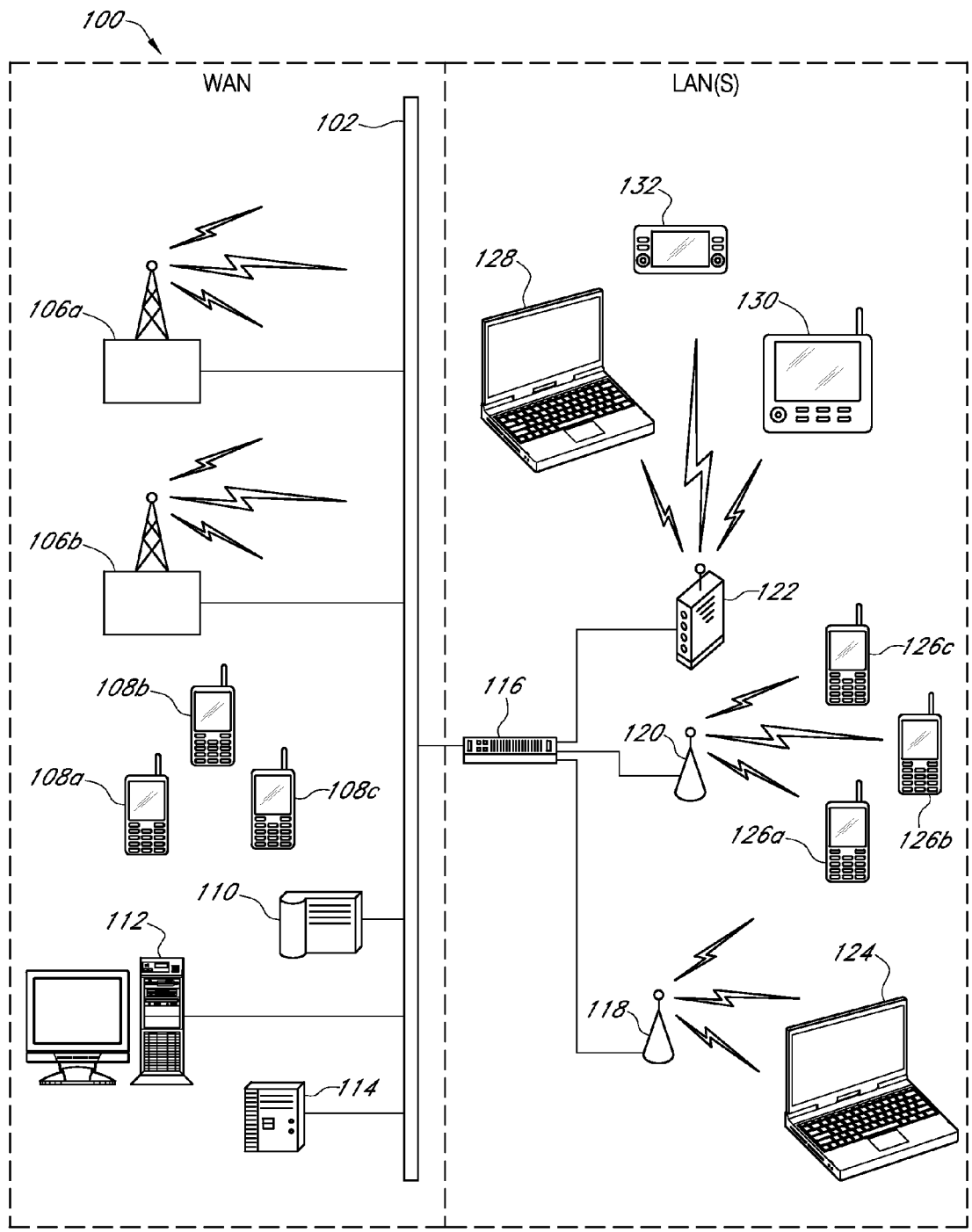
FIG. 1 illustrates a perspective view of a distributed data communications system in accordance with embodiments of the present invention.

In accordance with an exemplary embodiment of the present invention, FIG. 1 illustrates a networked computing system 100 including various wireline and wireless computing devices that may be utilized to implement any of the hybrid rate-limiting processes associated with various embodiments of the present invention. The specific network configuration shown in FIG. 1 is intended to give an example of a high-level computing system capable of facilitating various rate-limiting processes of the present invention. As would be understood by those skilled in the Art, many network configuration and topology changes could be made to the networked computing system 100 of FIG. 1, without departing from the spirit and scope of the present invention. The networked computing system 100 may include, but is not limited to, a group of service provider devices 110, 112, 114 and 116 (SPDs), including server computers (e.g., network controller devices) or any other common network device known in the art such as a routers, gateways, or switch devices, which can support network resource allocation and/or digital data communications services to various network subscriber computing devices (SCDs) (e.g., any of SCDs 108*a-c*, 124, 126*a-c*, 128, 130 and 132) within the networked computing system 100; a data communications network 102 (including both Wide Area Network (WAN) and Local Area Network LAN(S) portions); a variety of remote SCDs, including cellular phone/PDA devices 108*a-c* along with any other variety of portable wireless computing device well known in the art (e.g., electronic book devices, handheld gaming units, personal music players, netbooks, video recorders, Wi-Fi™ devices, etc.) that may be connected to the data communications network 102 utilizing one or more wireless basestations 106*a-b*, or any other common wireless or wireline network communications technology; one or more network gateways or switch devices 116 that can facilitate data communications processes within the LAN(S) and between the LAN(S) and the WAN of the data communications network 102; one or more local SCDs, including: one or more laptop or netbook computers 120 and 128, wireless cellular phones or PDAs 126*a-c*, electronic book devices 130, handheld gaming units 132, personal music players, video recorders, Wi-Fi™ devices, etc., that may be wirelessly connected to one or more local area network base stations 118, 120, and 122, or optionally directly or indirectly connected to a backhaul portion of the network (e.g., to data communications network 118) via any common wireline communications technology.

In an embodiment, any of the SPDs 110, 112, and 114, including any of the network basestations 106*a-b*, 118, 120, and 122, the router/gateway devices 116, or any of the remote or local SCDs 108*a-c*, 124, 126*a-c*, 128, 130, and 132, may be configured to run any known operating system, including but not limited to, Microsoft® Windows®, Mac OS®, Linux®, Unix®, or any common mobile operating system, including Symbian®, Palm®, Windows Mobile®, Mobile Linux®, MXI®, etc. In an embodiment, any of the SPDs 106*a-b*, 110, 112, 114, 116, 118, 120, and 122 (including network basestations) may employ any number of common server, desktop, laptop, and personal computing devices. In an embodiment, any of the SCDs 108*a-c*, 124, 126*a-c*, 128, 130, and 132 may include any combination of common mobile computing devices (e.g., laptop computers, netbook computers, cellular phones, PDAs, handheld gaming units, electronic book devices, personal music players, Mi-Fi™ devices, video recorders, etc.), having wireless communications capabilities employing any common wireless data commutations technology, including, but not limited to: Wi-Fi™, WiMAX™, GSMT™, UMTS™, LTE™, LTE Advanced™, etc.

In an embodiment, either of the LAN(S) or the WAN portions of the data communications network 102 of FIG. 1 may employ, but are not limited to, any of the following common communications technologies: optical fiber, coaxial cable, twisted pair cable, Ethernet cable, and powerline cable, along with any wireless communication technology known in the art. In an embodiment, any of the SPDs 110, 112, and 114, including any of the network basestations 106*a-b*, 118, 120, and 122, the router/gateway devices 116, or any of the remote or local SCDs 108*a-c*, 124, 126*a-c*, 128, 130, and 132, may include any standard computing software and hardware necessary for processing, storing, and communicating data amongst each other within the networked computing system 100. The computing hardware realized in any of the data networked computing system 100 computing devices 106*a-b*, 108*a-c*, 110, 112, 114, 116, 118, 120, 122, 124, 126*a-c*, 128, 130, and 132 may include, but is not limited to: one or more processors, volatile and non-volatile memories, user interfaces, transcoders, and wireline and/or wireless communications transceivers, etc.

In an embodiment, any of the SPDs 110, 112, and 114, including any of the network basestations 106*a-b*, 118, 120, and 122, the router/gateway devices 116, or any of the remote or local SCDs 108*a-c*, 124, 126*a-c*, 128, 130, and 132, may be configured to include one or more computer-readable media (e.g., any common volatile or non-volatile memory type) encoded with a set of computer readable instructions, which when executed, performs a portion of one or more of the hybrid-rate limiting processes and supporting communications functionality associated with various embodiments of the present invention.

Figure 2:
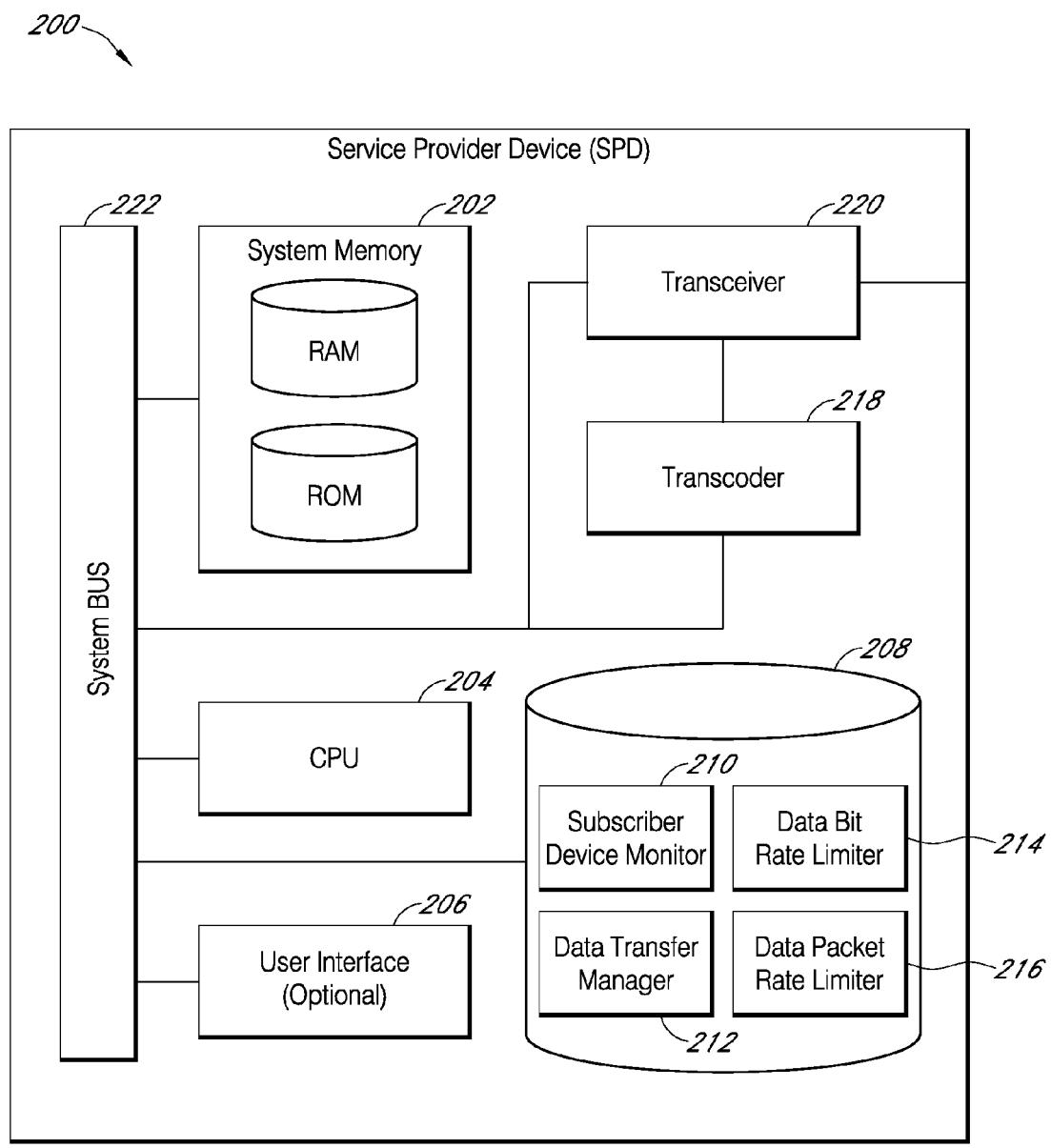
FIG. 2 illustrates a block diagram view of a service provider device (SPD) in accordance with embodiments of the present invention.

FIG. 2 shows a block diagram view of a SPD 200 that may be representative of any of the remote service provider devices SPDs 110, 112, and 114, including the network basestations 106*a-b*, 118, 120, and 122, and the router/gateway device(s) 116 of FIG. 1, or any other common network service provider device known in the art. The SPD 200 may include, but is not limited to, one or more processor devices including a central processing unit (CPU) 204. In an embodiment, the CPU 204 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 204 is responsible for executing all computer programs stored on the SPD's 200 volatile (RAM) and nonvolatile (ROM) system memories, 202 and 208.

The SPD 200 may also include, but is not limited to, an optional user interface 206 that allows a service provider administrator to interact with the SPD's 200 software and hardware resources; a software/database repository 208 including: a subscriber device monitor 210 that may facilitate the SPD 200 monitoring networked SCDs (e.g., any of SCDs 108*a-c*, 124, 126*a-c*, 128, 130, and 132) as well as their communications attributes, a data transfer manager application 212 that facilitates communications between the SPD 200 service-registered SCDs (e.g., any of SCDs 108*a-c*, 124, 126*a-c*, 128, 130, and 132), a data bit rate-limiting component 214 that is capable of rate-limiting PDU data bit based throughput (pertaining to total PDU data bit throughput (including both PDU header and payload data), and a data packet rate-limiting component 216 that is capable of rate-limiting data packet based throughput; a transcoder 218 for formatting data communications prior to transfer; a transceiver 220 for transmitting and receiving network communications amongst various network SCDs (e.g., any of SCDs 108*a-c*, 124, 126*a-c*, 128, 130, and 132) and SPDs (e.g., any of SPDs 106*a-b*, 110, 112, 114, 118, 120, 122, and 116) utilizing the data communication network 102 of the networked computing system 100; and a system bus 222 that facilitates data communications amongst all the hardware resources of the SPD 200.

In accordance with an embodiment of the present invention, the SPD 200 data transfer manager application 212 may be logically linked to the data bit rate-limiter component 214 and the data packet rate-limiter component 216, such that the hybrid rate-limiting schemes of the present invention may be applied to subscriber communications at the SPD 200. In an embodiment, a service provider controlling the operations of the SPD 200 may selectively enforce various subscriber data-rate plans (those specified in subscriber service level agreements) by simultaneously rate-limiting data bit throughput (e.g., pertaining to payload only data and/or total PDU data) using the data bit rate-limiter component 214 along with data packet throughput using the data packet rate-limiter component 216. In an embodiment, this data bit rate limiting and data packet rate-limiting may occur simultaneously in accordance with a token bucket or a leaky-bucket rate-limiting algorithm stored on one or more computer readable media resident at any of the SPDs 106a-b, 110, 112, 114, 116, 118, 120, and 122 of FIG. 1.

Figure 3:
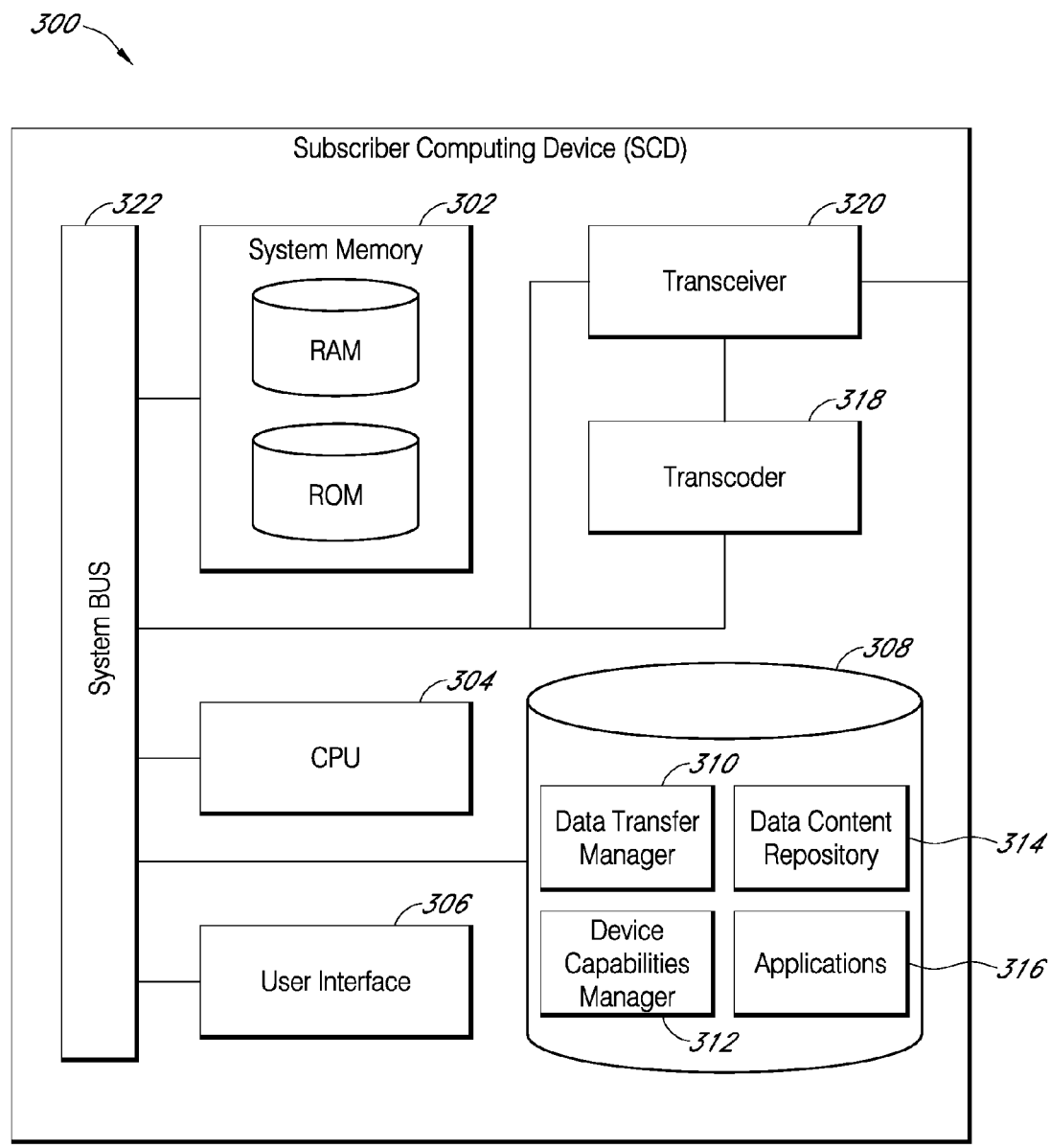
FIG. 3 illustrates a block diagram view of a subscriber computing device (SCD) in accordance with embodiments of the present invention.

FIG. 3 shows a block diagram view of a SCD 300 that may be representative of any of the SCDs 108a-c, 124, 126a-c, 128, 130, and 132 in FIG. 1. The SCD 300 may include, but is not limited to, one or more processor devices including a central processing unit (CPU) 304. In an embodiment, the CPU 304 may also include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 304 is responsible for executing all computer programs stored on the SCD's 300 volatile (RAM) and nonvolatile (ROM) system memories, 302 and 308.

The SCD 300 may also include, but is not limited to, a user interface 306 that allows a user to interact with the SCD's 300 software and hardware resources; a software/database repository 308 including: a data transfer manager application 310 that facilitates communications amongst the SCD 300, various SPDs (e.g., any of SPDs 106a-b, 110, 112, 114, 116, 118, 120, and 122), and other networked SCDs (e.g., any of SCDs 108a-c, 124, 126a-c, 128, 130, and 132) utilizing the data communication network 102 of the networked computing system 100, a device capabilities manager application 312 that keeps track of SCD resource capabilities (data processing capability) for informing a sending device (e.g., any of SPDs 106a-b, 110, 112, 114, 116, 118, 120, and 122) of receiving capability data so a sending device can determine how apply various rate-limiting algorithms associated with the present invention; a data content repository 314 comprising user data and communications related data and parameters, and various end-user applications 316 that can allow the SCD 300 to perform various local functions utilizing resident hardware and software resources, and an applications repository 316 storing various end user loaded and/or resident, device specific software applications; a transcoder 318 for formatting data communications prior to transfer; a transceiver 320 for transmitting and receiving network communications amongst various network SCDs (e.g., any of SCDs 108a-c, 124, 126a-c, 128, 130, and 132) and SPDs (e.g., any of SPDs 106a-b, 110, 112, 114, 116, 118, 120, and 122) utilizing the data communication network 102 of the networked computing system 100; and a system bus 322 that facilitates data communications amongst all the hardware resources of the SCD 300.

Figure 4A:
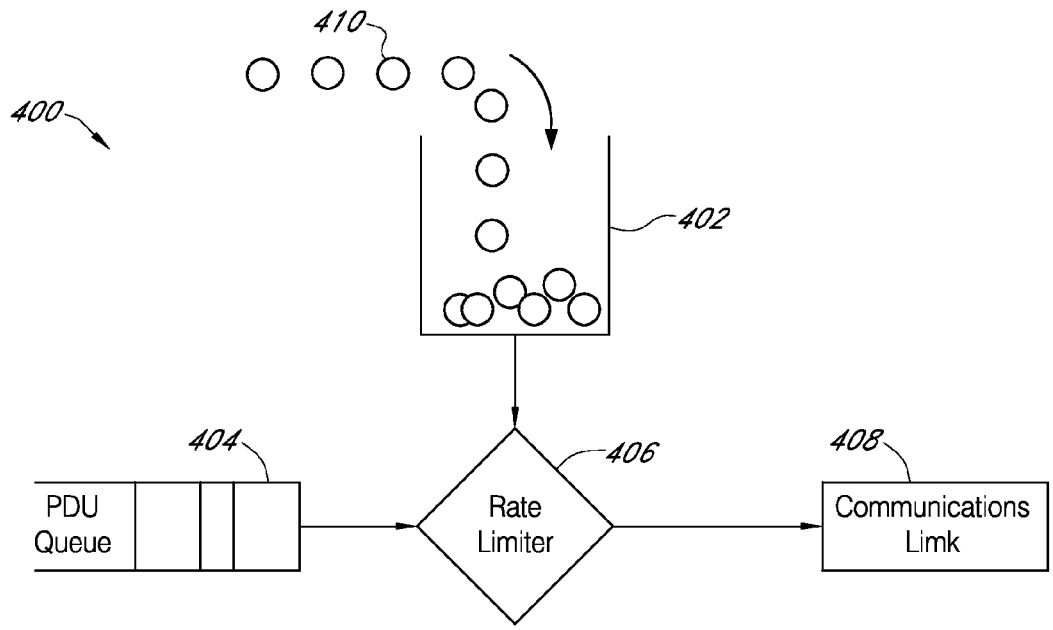
FIG. 4A illustrates a token and bucket rate-limiting diagram associated with single rate, rate-limiting processing in data communications systems of the Prior Art.

FIG. 4A illustrates a standard token bucket rate-limiting diagram depicting a process 400 associated with the Prior Art that generally rate-limits only user generated traffic. Tokens 410 representing a service level agreement's specified, available data may be added to a single token bucket 402 at a constant rate. A token represents a service level permission to transmit a certain number of bytes or bits worth of data during a particular time. The token bucket 402 has a predetermined token retainer size, corresponding to a maximum number of tokens that the token bucket 402 can hold at any time, which further corresponds to the maximum number of bytes that can be transmitted in a single burst on a data communications link 408 at a particular time (in-line with a particular service level agreement). This is known as the maximum burst size of the user-generated traffic that can be placed on the communications link 408. As PDUs of a data transfer session arrive at a SPD 200 (e.g., a SPD employing a single token bucket rate-limiting algorithm), the PDUs are initially placed in a PDU queue 404, awaiting transfer.

In some rate-limiting processes 400, it should be understood that a PDU queue 404 may only hold a single packet at a time that can only be queued if there are sufficient tokens in the token bucket 402 to subsequently allow the packet to be placed on the data communications link 408. In other processes, if the PDU queue 404 has reached a maximum depth (e.g., corresponding to either a maximum number of packets or maximum number of data bits allowed in the PDU queue 404) and a new packet arrives, the new packet may be dropped, because the PDU queue is already at a maximum capacity. Alternatively, in some scenarios, a packet at the head of the PDU queue 404 (the oldest packet in the queue) may be dropped from the queue to allow the newest arriving packet to be inserted at the tail of the PDU queue 404. This behavior may be dependent on the type of data arriving at the PDU queue 404 as well as on the present capacity and characteristics associated with the PDU queue 404.

A single rate rate-limiter 406, then determines if there are sufficient tokens 410 in the single token bucket 402 to allow the next PDU in queue 404 to be pulled from the head of the queue and placed on the data communications link 408. If there are enough tokens 410 available in the token bucket 402, subsequently, the rate limiter 406 removes the PDU from the queue 404 and places the PDU on the communications link 408 for transfer to an end receiving device. The rate limiter also removes tokens from the token bucket corresponding to the PDU size. This process repeats for every PDU in queue 404. Generally, a particular number of tokens 410 may correspond to a size of single PDU. Accordingly, multiple tokens 410 may be removed from the token bucket 402 to facilitate the transfer of a single PDU.

If the number of bytes or bits represented by the tokens 410 in the token bucket 402 is less than the size of the PDU at the head of the queue 404, then the PDU is held in the queue 404 until a sufficient additional number of tokens 410 have been added to the token bucket 402. The standard single token bucket rate-limiter can only facilitate a service provider specifying a maximum throughput for one definition of throughput of a data flow (e.g., pertaining to user generated traffic) over a particular data communications link 408.

In an embodiment, the present invention may employ two rate limits, which may be applied simultaneously to data being transmitted between a data transmitter (e.g., a sending SCD 108a-c, 124, 126a-c, 128, 130, 132 and/or a SPD 106a-b, 110, 112, 114, 116, 118, 120, 122) and a data receiver (e.g., a receiving SCD 108a-c, 124, 126a-c, 128, 130, and 132). The first limit may correspond to a maximum bits per second rate limit and the second limit may correspond to a maximum data packets per second rate limit. As will be further described herein, the present invention employs an algorithm consisting of two or three token buckets components operating in parallel. As would be understood by those skilled in the Art, an analogous algorithm employing two or three leaky buckets operating in parallel, could be used as well without departing from the spirit and scope of the present invention.

Figure 4B:
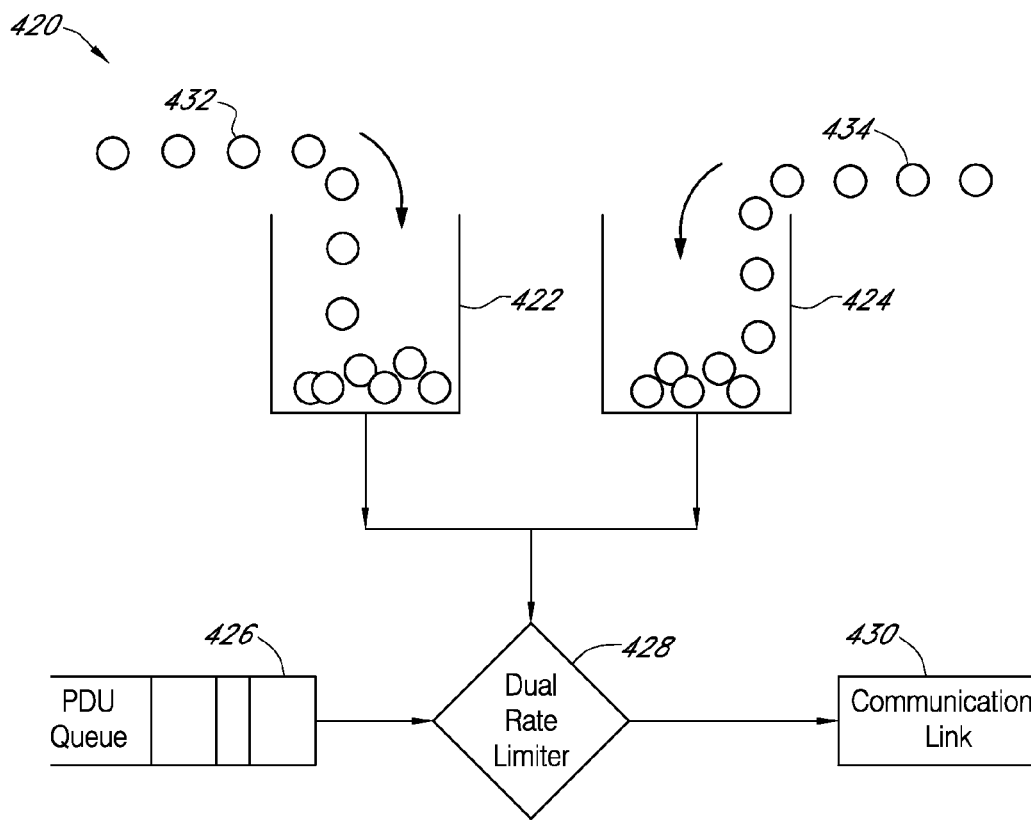
FIG. 4B illustrates a token and bucket rate-limiting diagram associated with dual rate, rate-limiting processing in distributed data communications systems associated with embodiments of the present invention.

FIG. 4B illustrates a hybrid token bucket rate-limiting diagram 400 depicting various rate-limiting processes associated with embodiments of the present invention. These rate-limiting processes may facilitate rate-limiting the number of data bits that may be sent from a transmitter to a receiver during a predetermined unit of time (e.g., in units of seconds) and rate-limiting the number of data packets that may be sent from a transmitter to a receiver during a predetermined unit of time (e.g., in units of seconds). In an embodiment, data may only be transmitted if there are sufficient tokens in both a first token bucket component 422 (a data bits per second token bucket) and a second token bucket component 424 (a data packets per second token bucket).

In an embodiment, bits per second tokens 432 representing a service level agreement's specified, available transfer capacity are added to a first token bucket component 422 at a constant rate. Simultaneously, packets per second tokens 434, also representing the service level agreement's specified, available transfer capacity, may be added to a second token bucket component 424 at a constant rate. Each of the first 422 and the second 424 token bucket components have predetermined token retainer sizes, corresponding to a maximum number of tokens that each token bucket 422, 424 can respectively hold at any time, which proportionally corresponds to the maximum number of bits/bytes that can be transmitted in a continuous burst on a data communications link 430 at a particular time (in-line with a particular service level agreement).

As PDUs of a data transfer arrive at a SPD 200 (e.g., a SPD employing a dual token bucket rate-limiting algorithm), the PDUs are initially placed in a PDU queue 426, awaiting transfer. A dual rate limiter 428, then determines if there are sufficient tokens 432, 434 in each of first and second token bucket components 422, 424 to allow the next PDU in queue 426 to be pulled from the head of the queue and placed on the data communications link 430. If there are enough tokens 432, 434 available in both token bucket components 422, 424, subsequently, the dual rate limiter 428 removes the leading PDU from the queue 426 and places the PDU on the communications link 430 for transfer to an end receiving device. This process repeats for every PDU in the queue 426. In contrast, if there are not enough tokens 432, 434 independently available in either token bucket 422, 424, then the dual rate limiter 428 holds the leading PDU in queue 426 until sufficient tokens 432, 434 become available to facilitate the data transfer of the next PDU in queue 426. This token-availability verification process repeats for every PDU in queue 426 for a given data transmission.

Figure 5:
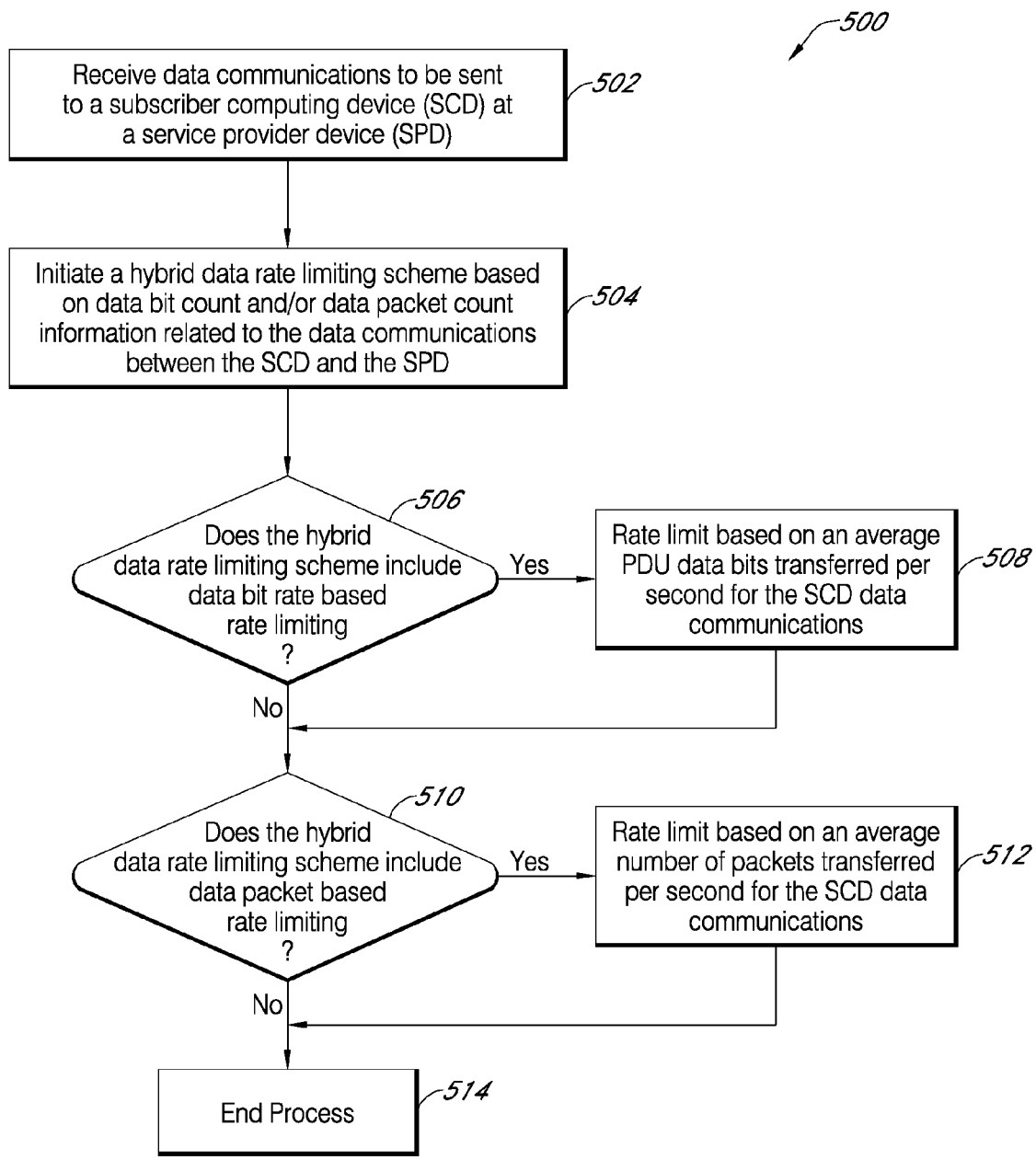
FIG. 5 illustrates a flow diagram depicting dual token and bucket rate-limiting processes associated with an embodiment of the present invention.

FIG. 5 illustrates a flow diagram 500 depicting a hybrid rate-limiting process associated with an embodiment of the present invention. It should be understood that this process 500 could be executed using one or more computer-executable programs stored on one or more computer-readable media located on any of the network computing system's 100 SPDs 106a-b, 110, 112, 114, 116, 118, 120, and 122 of FIG. 1 (or on any other common service provider device). At block 502, a service provider device (e.g., any of SPDs 106a-b, 110, 112, 114, 116, 118, 120, and 122) receives data communication to be sent to a SCD, emanating from either another network SCD or a SPD. Next, at block 504, a hybrid rate-limiting scheme is initiated based on data bit count and/or data packet count information related to the data communications between the SCD and the SPD.

Then at decision block 506 it is determined if the hybrid rate-limiting scheme includes data bit rate based rate-limiting. If it is determined that the hybrid rate-limiting scheme does include data bit rate based rate-limiting, then at block 508, the data communications to the SCD is rate-limited based on an average PDU data bits transferred per unit of time for the SCD data communications. Next, the process proceeds to decision block 510. If it is determined that the hybrid rate-limiting scheme does not include data bit rate rate-limiting, then at decision block 510, it is determined if the hybrid rate-limiting scheme includes data packet rate based rate-limiting. If it is determined that the hybrid rate-limiting scheme does include data packet rate based rate-limiting, then the process proceeds to block 512, where the data communications to the SCD are rate-limited based on an average number of packets transferred per second. Subsequently the process ends at block 514. If it is determined that the hybrid rate-limiting scheme does not include data packet rate based rate-limiting, then the process ends to block 514.

In an embodiment, hybrid data rate-limiting (generally employed at a SPD 200) may include the simultaneous limiting for both data bit rate(s) and data packet rate for a portion of regional subscriber communications. In another embodiment, hybrid data rate-limiting may include separate, sequential limiting of both data bit rate(s) and data packet rate at different times in a hybrid rate-limiting process. In another embodiment, hybrid rate-limiting may include only rate-limiting one of data bit rate or data packet rate at various stages in a rate-limiting process.

Figure 6:
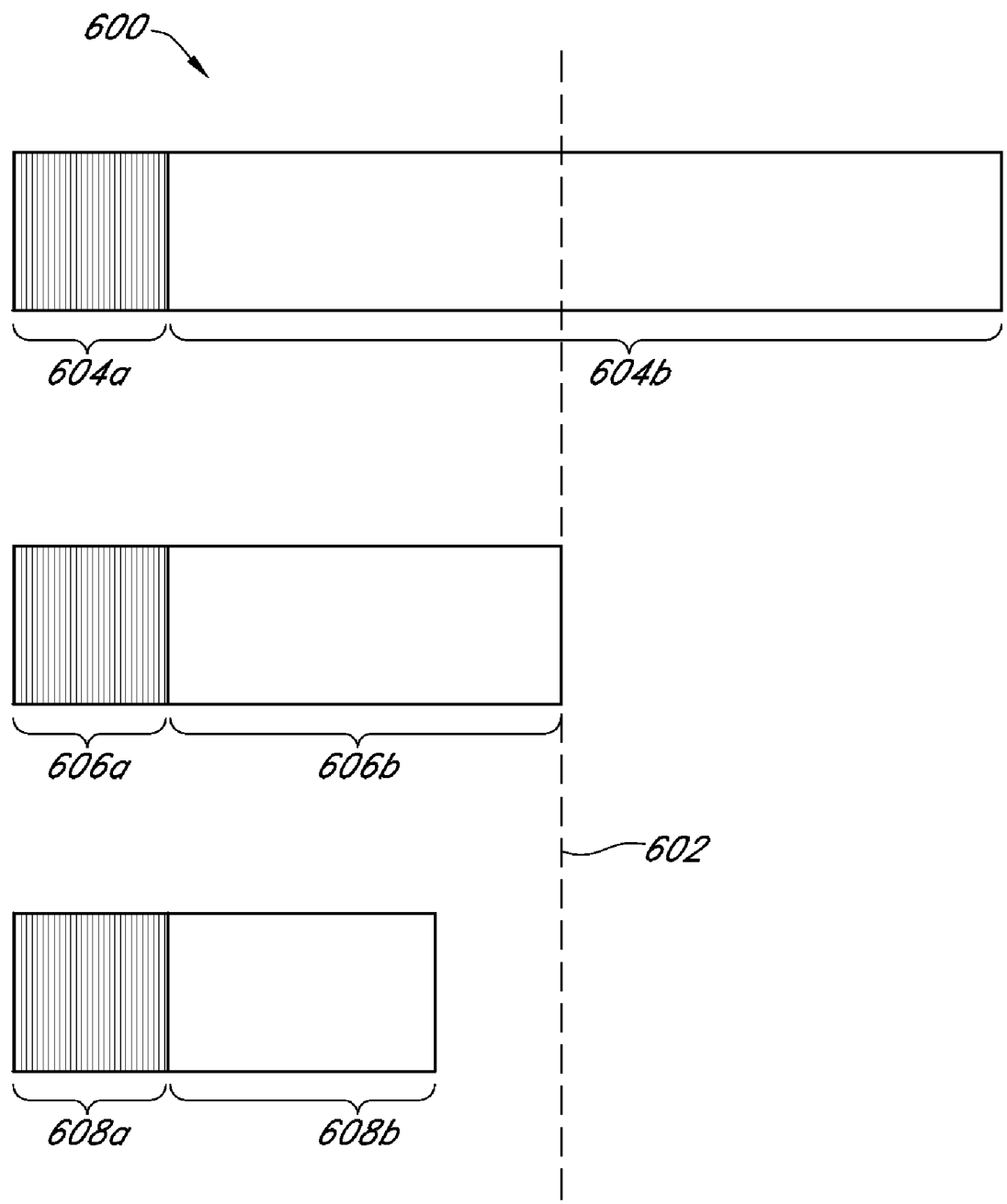
FIG. 6 illustrates a perspective view of multiple protocol data units (PDUs), having both header and payload data, which are representative of average PDUs sizes that could be communicated across a distributed data communications system in accordance with embodiments of the present invention.

FIG. 6 depicts a view of three PDUs 600 representative of average PDU sizes for multiple, different data-type transfers (e.g., for data transfers having a substantially large average PDU payload, for data transfers having moderately sized average PDU payload, and for data transfers having a small average PDU payload). The PDUs 600 are vertically aligned in descending order according to both average PDU payload size and average total PDU size, including combined PDU header and payload size. An average PDU size limit threshold is represented by a dotted line 602 that is vertically aligned perpendicular to all three PDUs' 600 lengthwise directions. From top to bottom, all three PDUs 600 may have a fixed PDU header data size 604a, 606a, and 608a, corresponding to set number of bits/bytes of header data (e.g., 240 bits or 30 bytes of header data).

These bits/bytes of PDU header data may pertain to various data transfer information including, but not limited to: a destination address (e.g., an IP address where a PDU is being routed through or delivered to), an originating address (e.g., an IP address where a PDU came from), PDU size information, synchronization information that allows a PDU to be compatible within an existing network infrastructure, a PDU sequence number that identifies which PDU a current PDU pertains to in a sequence of PDUs, a PDU protocol (with networks that carry many different types of information, the PDU protocol defines what type of PDU is being transmitted: e-mail data, webpage data, streaming video data, image data, etc.), encryption security data (encapsulating security payload information), etc.

All three PDUs may have varying payload data sizes 604b, 606b, and 608b. Similarly, all three PDUs 600 may have the same or varying PDU header data size 604a, 606a, and 608a. In implementing hybrid rate-limiting schemes in accordance with various embodiments of the present invention, both PDU payload only bit rate and total PDU bit rate may be simultaneously rate-limited in accordance with average PDU size limit thresholds represented by average PDU size limit threshold 602 measured in bits/bytes.

In accordance with various embodiments of the present invention, one data transfer rate may be enforced for the PDU payload bit rate of the PDUs in a particular data communications session, while at the same time, a separate data transfer rate may to be enforced for the total PDU bit rate, which includes both PDU header and payload data. By employing hybrid rate-limiting schemes that enable multiple independent data transfer rates to be enforced at the same time, both wireless and wireline data communications providers may specify in their service level agreements, maximum user data throughput on the communications link as long as an average PDU size (e.g., an average total PDU size) of user data is above a threshold size. If the average user PDU size is below the threshold size then a total amount of link resources consumed by a particular data flow may be capped by a second threshold limit (e.g., an average PDU payload size).

As would be understood by those skilled in the art with a constant PDU payload throughput (e.g., a throughput measured in Mbps) on a particular network communications link, actual link throughput (including fixed-size PDU header data, measured in bytes) proportionally depends on an average PDU payload size. Due to the fact that an actual link throughput can drastically change with respect to variations in average PDU payload size (as the average PDU payload size decreases, while PDU payload throughput and header data size remain constant), there can be extreme scenarios where actual link throughput may be negatively impacted based on the nature of data communications that result in a relatively small average PDU payload data size (e.g., at average PDU payload sizes less than 100 bytes or 800 bits).

Figure 7:
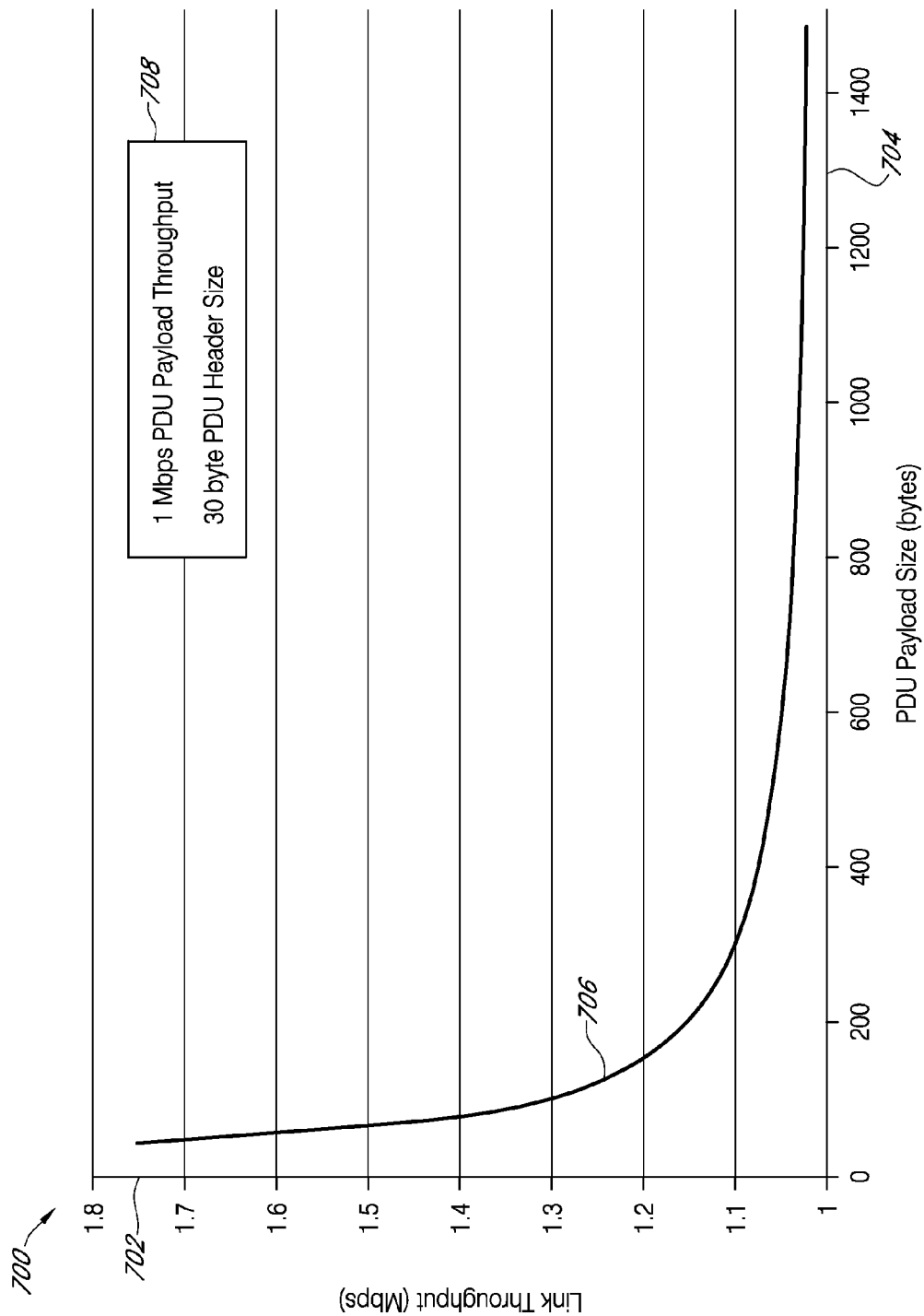
FIG. 7 illustrates a graphical representation of how a data communications link's throughput changes in proportion to changes in average PDU payload size in accordance with embodiments of the present invention.

A graphical representation of this phenomenon can be seen in the Link Throughput vs. PDU Payload Size plot 700 illustrated in FIG. 7. This rate of change plot 700 has an x-axis 704 representing PDU payload size (in bytes), and a y-axis 702 representing actual link throughput in Mbps. The curve 706 represents the change in link throughput with respect to the change in PDU payload size at a constrained PDU payload throughput of 1 Mbps and a constrained PDU header size of 30 bytes or 240 bits (See legend 708 for constrained variables). As graphically depicted by the curve 706, as PDU payload size 704 becomes substantially small (e.g., less than 10× the PDU header size), total link throughput 702 increases rapidly. As would be understood from the above relationships of PDU payload size to link throughput (depicted in FIG. 7), it may be desired to enforce separate rate limits for payload-only portions of data packets and for total packet data (e.g., including both header and payload data), as well as a data packet rate limit. These systems and methods are further described in co-pending U.S. patent application Ser. No. 12/690,883, SYSTEMS AND METHODS FOR HYBRID RATE-LIMITING SCHEMES BASED ON PROTOCOL DATA UNIT CHARACTERISTICS, filed Jan. 20, 2010, incorporated herein by reference.

Figure 8:
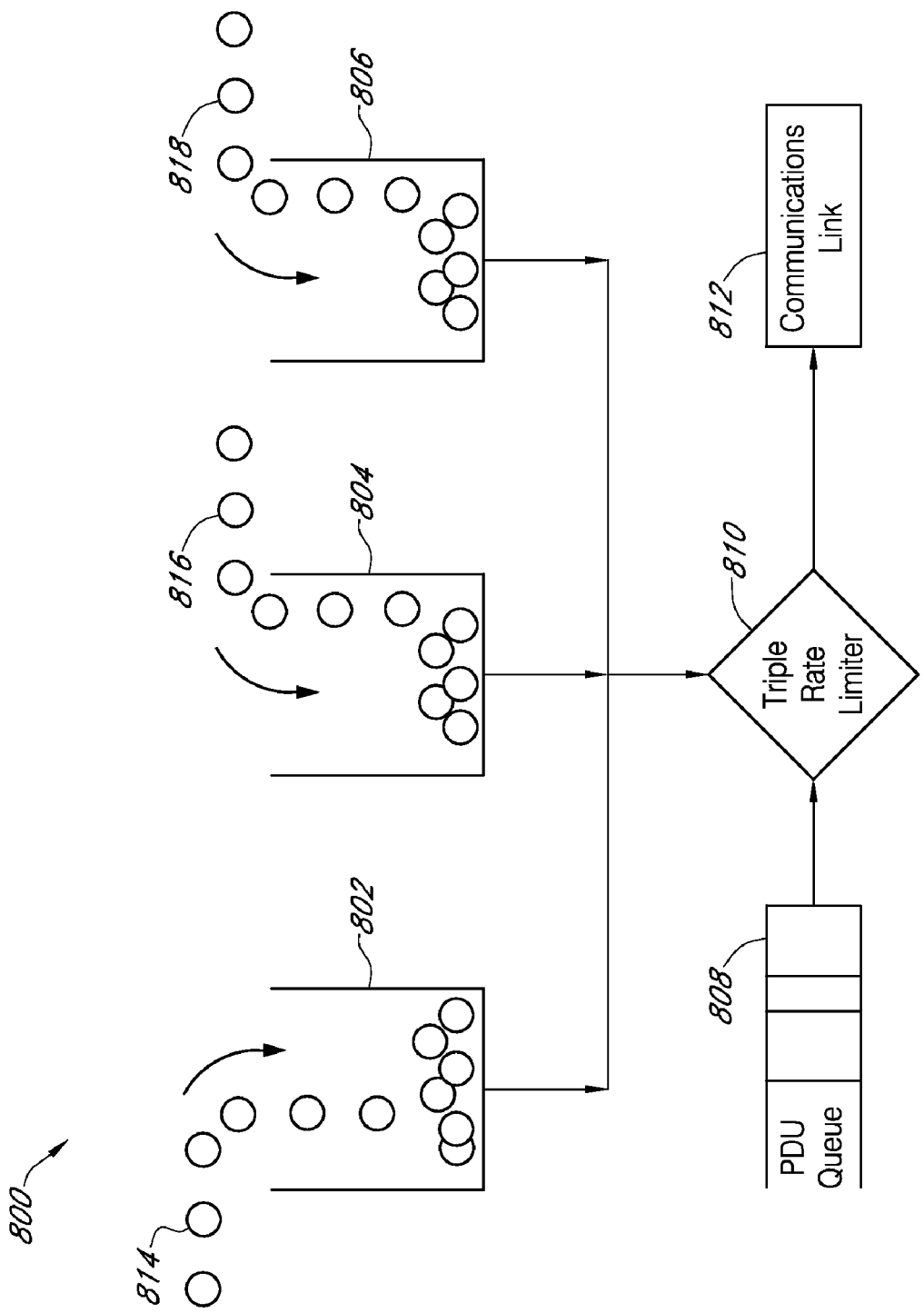
FIG. 8 illustrates a token and bucket rate-limiting diagram associated with triple rate, rate-limiting processing in distributed data communications systems associated with embodiments of the present invention.

FIG. 8 illustrates a hybrid token bucket rate-limiting diagram 800 depicting various rate-limiting processes associated with an embodiment of the present invention. These rate-limiting processes may facilitate rate-limiting the number of data bits (relating to both packet payload only data and total packet data) that may be sent from a transmitter to a receiver during a predetermined unit of time (e.g., in units of seconds) and rate-limiting the number of data packets that may be sent from a transmitter to a receiver during a predetermined unit of time (e.g., in units of seconds). In an embodiment, data communications may only be transmitted if there are sufficient tokens in all of a first token bucket 802 component (a packet data payload only bits per second rate-limiting bucket), a second token bucket component 804 (a total packet data bits per second rate-limiting bucket), and a third token bucket component 806 (a data packets per second rate-limiting bucket).

In an embodiment, packet payload only bits per second tokens 814 representing a service level agreement's specified, available transfer capacity are added to a first token bucket component 802 at a constant rate. Simultaneously, total packet bits per second tokens 816 and packets per second tokens 818, representing a service level agreement's specified, available transfer capacity are respectively added to a second 804 and a third 806 token bucket components at a constant rate. Each of the first 802, second 804, and third 806 token bucket components have predetermined token retainer sizes, corresponding to a maximum number of tokens that each token bucket can hold at any time, which proportionally corresponds to the maximum number of bits/bytes that can be transmitted in a continuous burst on a data communications link 812 at a particular time (in-line with a particular service level agreement).

As PDUs of a data transfer arrive at a SPD 200 (e.g., a SPD employing a triple token bucket rate-limiting algorithm), the PDUs are initially placed in a PDU queue 808, awaiting transfer. A triple rate rate-limiter 810, then determines if there are sufficient tokens 814, 816, 818 in each of first 802, second 804, and third 806 token bucket components to allow the next PDU in queue 808 to be pulled from the head of the queue and placed on the data communications link 812. If there are enough tokens 814, 816, 818 available in both all three token bucket components 802, 804, 806, subsequently, the triple rate-limiter 810 removes the leading PDU from the queue 808 and places the PDU on the communications link 812 for transfer to an end receiving device (e.g., a SCD). This process repeats for every PDU in the queue 808. In contrast, if there are not enough tokens 814, 816, 818 independently available in each token bucket 802, 804, 806, then the triple rate limiter 810 holds the leading PDU in queue 808 until sufficient tokens 814, 816, 818 become available to facilitate the data transfer of the next PDU in queue 808. This token-availability verification process repeats for every PDU in queue 808 for a given data transmission session.

In an embodiment, the maximum number of tokens 814 that can be placed in the first PDU bits per second token bucket 802 represents the maximum number of PDU payload data bits that can be sent at the maximum transfer rate of the link between a transmitter and a receiver. The maximum number of tokens 816 that can be placed in the second PDU bits per second token bucket 804 represents the maximum number of PDU payload and header data bits that can be sent at the maximum transfer rate of the link between a transmitter and a receiver. Whereas, the maximum number of tokens 818 that can be placed in the packets per second token bucket 806 represents the maximum number of data packets that can be sent at the maximum transfer rate between a transmitter and a receiver.

In an embodiment, it may be advantageous to communicate the receiver capabilities to the transmitter. In most data communications sessions, a transmitter likely needs to know of the capabilities of one or more intended receiver(s) prior to a communications session. This will allow the sending node to determine what maximum transfer rate in bits per second and/or packets per second that the receiver can process received data. In some data communications systems, capabilities information may be known by the transmitter device (e.g., a network base station). In other data communications systems, where a transmitter may be sending data to a variety of different receiver types, the transmitter may initially send a message to the receiver asking it for its capabilities information. The receiver may respond with the capabilities in units of bits per second and packets per second, or similar units. In other systems, the receiver may respond with general device class information where the capabilities of a device belonging to a particular class are known to the transmitter. In other systems, a transmitter may query the receiver for make and/or model information. In various embodiments, a transmitter may use obtained capabilities information to determine the maximum rate at which to transmit data to the receiver on a particular communications link.

Figure 9:
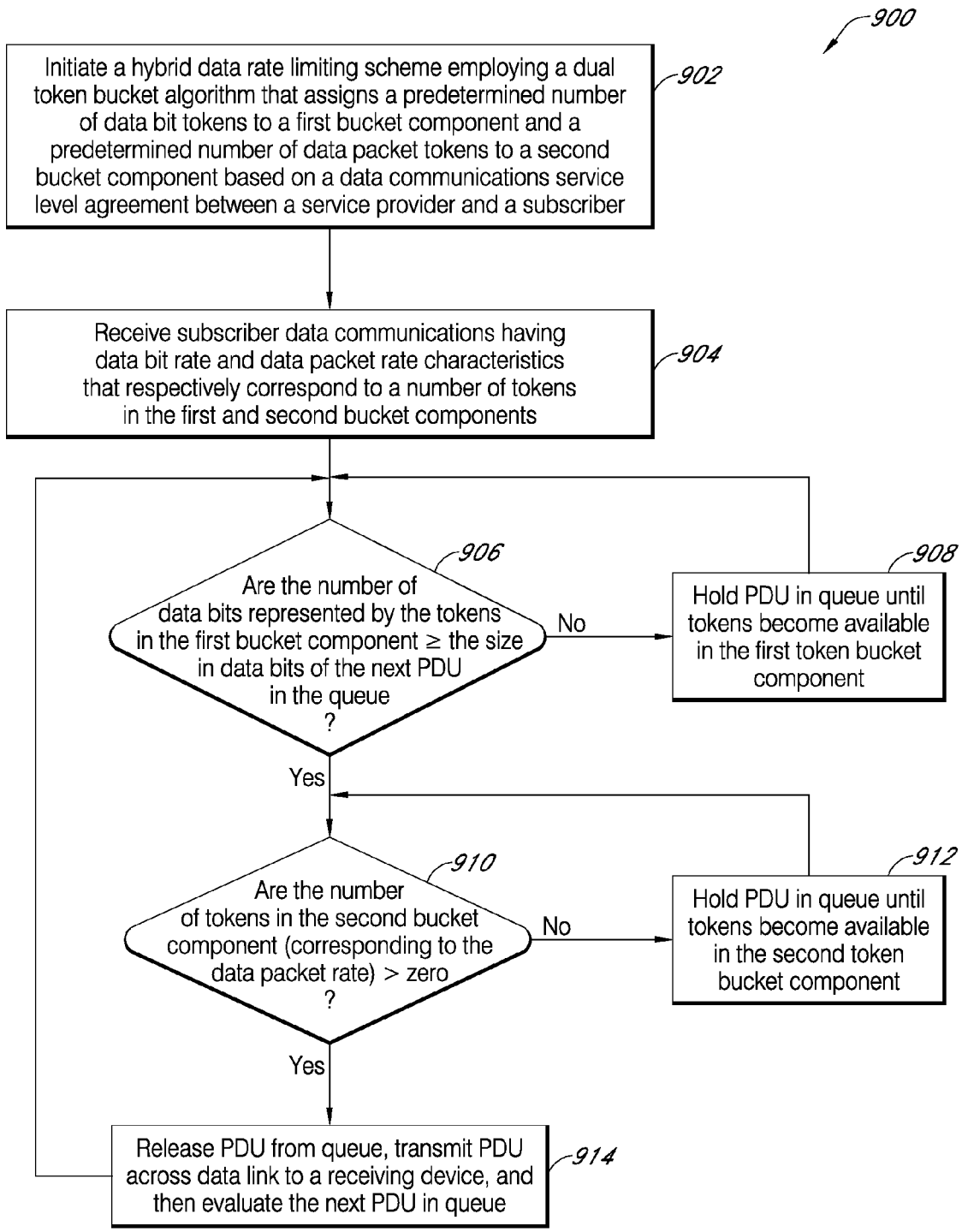
FIG. 9 illustrates a flow diagram depicting dual token and bucket rate-limiting processes, associated with an embodiment of the present invention.

FIG. 9 illustrates a flow diagram 900 depicting dual token and bucket rate-limiting processes, associated with an embodiment of the present invention. It should be understood that this process 900 could be executed using one or more computer-executable programs stored on one or more computer-readable media located on any of the network computing system's 100 SPDs 106a-b, 110, 112, 114, 116, 118, 120, and 122 of FIG. 1 (or on any other common service provider device). At block 902, a service provider device (e.g., any of SPDs 106a-b, 110, 112, 114, 116, 118, 120, and 122) initiates a hybrid rate-limiting scheme employing a dual token bucket algorithm that assigns a predetermined number of data bit rate tokens 432 to a first token bucket component 422 and a second number of data packet rate tokens 434 to a second token bucket component 424 based on a data communications service level agreement between a service provider and a subscriber. Then at block 904 the SPD receives subscriber data communications having data bit rate and data packet rate characteristics that respectively correspond to a number of tokens 432, 434 in the first 422 and the second 424 token bucket components.

Subsequently, at decision block 906, it is determined if the number of data bits represented by the tokens 432 in the first token bucket component 422 is greater than or equal to the size in data bits of the next PDU in the PDU queue 426. If it is determined that the number of data bits represented by the tokens 432 in the first token bucket component 422 is not greater than or equal to the size in data bits of the next PDU in the PDU queue 426, then at block 908 the next PDU in queue is held until sufficient tokens 432 become available in the first token bucket component 422. The process then reverts back to decision block 906 for further determinations. However, if it is determined the number of data bits represented by the tokens 432 in the first token bucket component 422 is greater than or equal to the size in data bits of the next PDU in the PDU queue 426, then the process proceeds to decision block 910 where it is determined if the number tokens 434 in the second token bucket component 424 (corresponding to the data packet rate) is greater than zero. If it is determined that the number of tokens 434 in the second token bucket component 424 is not greater than zero, then the process proceeds to block 912, where the next PDU in queue is held until sufficient tokens 434 become available in the second token bucket component 424. The process then reverts back to decision block 910 for further determinations. However, if it is determined that that number of tokens 434 in the second token bucket component 424 is greater than zero, then the next PDU in queue is released from the queue and transmitted across the data communications link 430 to a receiving device. Subsequently, the next PDU in queue is evaluated and the process reverts back to decision block 906 for further determinations. It would be understood by those skilled in the Art that the ordering of decisions made at decision blocks 906 and 910 could be reversed without departing from the spirit and scope of the present invention.

Figure 10:
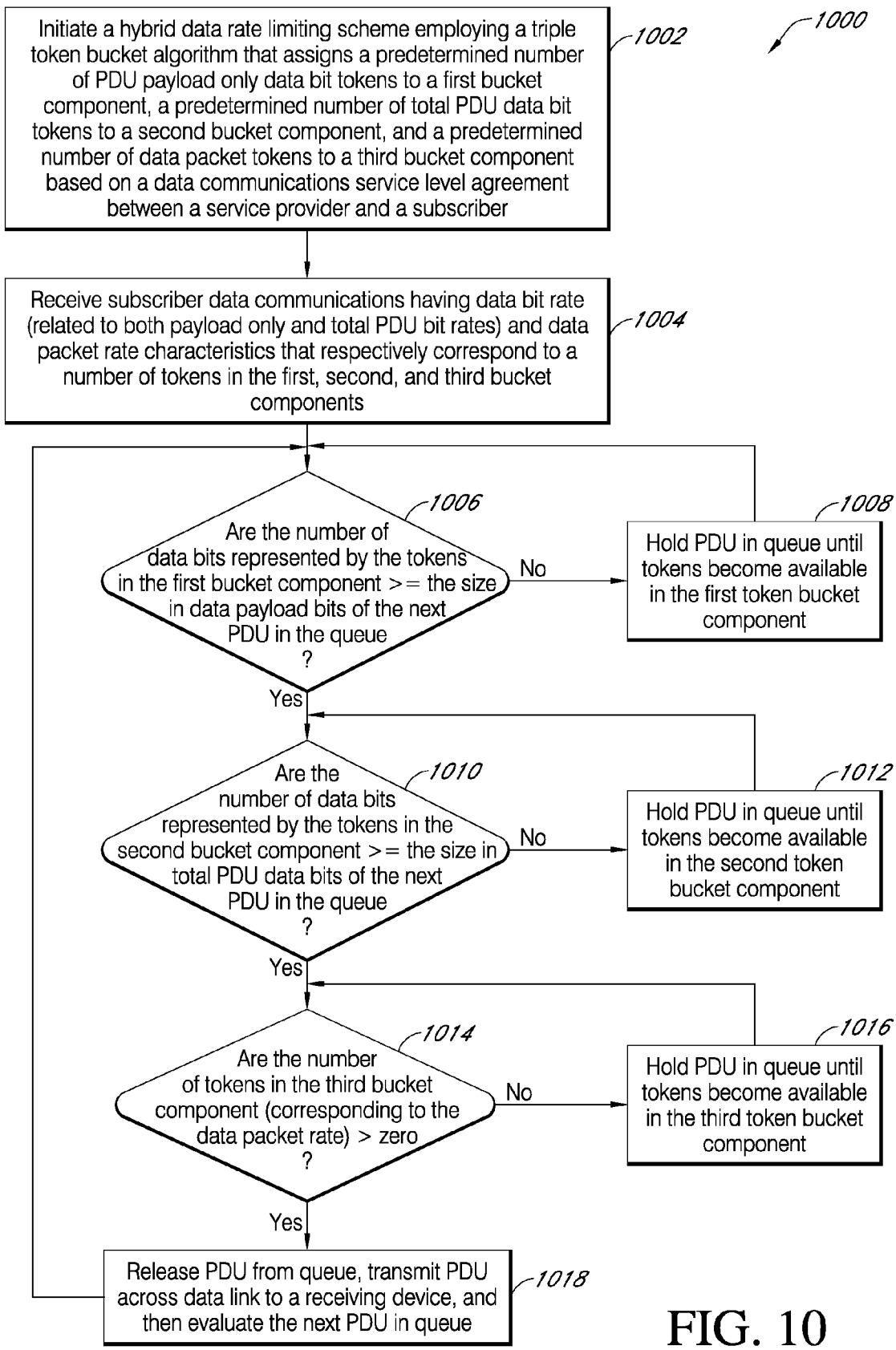
FIG. 10 illustrates a flow diagram depicting triple token and bucket rate-limiting processes, associated with an embodiment of the present invention.

FIG. 10 illustrates a flow diagram 1000 depicting triple token and bucket rate-limiting processes, associated with an embodiment of the present invention. It should be understood that this process 1000 could be executed using one or more computer-executable programs stored on one or more computer-readable media located on any of the network computing system's 100 SPDs 106a-b, 110, 112, 114, 116, 118, 120, and 122 of FIG. 1 (or on any other common service provider device). At block 1002, a service provider device (e.g., any of SPDs 106a-b, 110, 112, 114, 116, 118, 120, and 122) initiates a hybrid rate-limiting scheme employing a triple token bucket algorithm that assigns a predetermined number of PDU payload only data bit rate tokens 814 to a first token bucket component 802, a predetermined number of total PDU data bit tokens 816 to a second token bucket component 804, and a predetermined number of data packet rate tokens 818 to a third token bucket component 806, based on a data communications service level agreement between a service provider and a subscriber. Then at block 1004 the SPD receives subscriber data communications having data bit rate (relating to both PDU payload only and total PDU data bit rates) and data packet rate characteristics that respectively correspond to a number of tokens 814, 816, 818 in the first 802, the second 804, and the third 806 token bucket components.

Subsequently, at decision block 1006, it is determined if the number of data bits represented by the tokens 814 in the first token bucket component 802 is greater than or equal to the size in data bits of the payload portion of the next PDU in the PDU queue 808. If it is determined that the number of data bits represented by the tokens 814 in the first token bucket component 802 is not greater than or equal to the size in data bits of the payload portion of the next PDU in the PDU queue 808, then at block 1008 the next PDU in queue is held until sufficient tokens 814 become available in the first token bucket component 802. The process then reverts back to decision block 1006 for further determinations. However, if it is determined the number of data bits represented by the tokens 814 in the first token bucket component 802 is greater than or equal to the size in data bits of the payload portion of the next PDU in the PDU queue 808, then the process proceeds to decision block 1010 where it is determined if the number of tokens 816 in the second token bucket component 804 is greater than or equal to the total size in data bits of the next PDU in the PDU queue 808. If it is determined that the number of data bits represented by the tokens 816 in the second token bucket component 804 is not greater than or equal to the total size in data bits of the next PDU in the PDU queue 808, then at block 1012 the next PDU in the queue is held until sufficient tokens 816 become available in the second token bucket component 804. The process then reverts back to decision block 1010 for further determinations.

However, if it is determined the number of data bits represented by the tokens 816 in the second token bucket component 804 is greater than or equal to the total size in data bits of the next PDU in the PDU queue 808, then the process proceeds to decision block 1014 where it is determined if the number tokens 818 in the third token bucket component 806 (corresponding to the data packet rate) is greater than zero. If it is determined that the number of tokens 818 in the third token bucket component 806 is not greater than zero, then the process proceeds to block 1016, where the next PDU in queue is held until sufficient tokens 818 become available in the third token bucket component 806. The process then reverts back to decision block 1014 for further determinations. However, if it is determined that that number of tokens 818 in the third token bucket component 806 is greater than zero, then at block 1018 the next PDU in queue is released from the queue 808 and transmitted across the data communications link 812 to a receiving device. Subsequently, the next PDU in queue is evaluated and the process reverts back to decision block 1006 for further determinations. It would be understood by those skilled in the Art that the ordering of decisions made at decision blocks 1006, 1010 and 1014 could be resequenced without departing from the spirit and scope of the present invention.

While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

The embodiments of the invention in which an exclusive property or privilege is claimed are defined as follows:

1. A networked computing system employing a hybrid rate-limiting scheme, the networked computing system comprising:
    at least one service provider device (SPD);
    at least one subscriber computing device (SCD); and
    a data communications network facilitating data communications amongst all devices of the networked computing system,
    wherein a SPD applies a hybrid rate-limiting scheme to data communications provided to a SCD, based on at least one of a data bit count and a data packet count.

2. The networked computing system of claim 1, wherein the hybrid rate-limiting scheme facilitates rate-limiting based on the number of protocol data unit (PDU) data bits counted per unit of time.

3. The networked computing system of claim 2, wherein the hybrid rate-limiting scheme further concurrently facilitates rate-limiting based on the number of data packets counted per unit of time.

4. The networked computing system of claim 1, wherein the hybrid rate-limiting scheme further comprises a dual token bucket algorithm that facilitates rate-limiting PDUs in a data transfer queue utilizing a first token bucket component for metering data bits and a second token bucket component for metering data packets.

5. The networked computing system of claim 4, wherein if the dual token bucket algorithm determines that there are not enough data bit tokens in the first token bucket component or that there are not enough data packet tokens in the second token bucket component, to facilitate transfer of a next PDU in the data transfer queue, the next PDU is held in the data transfer queue until sufficient tokens become available.

6. The networked computing system of claim 1, wherein the hybrid rate-limiting scheme further comprises a triple token bucket algorithm that facilitates rate-limiting PDUs in a data transfer queue utilizing a first token bucket component for metering data bits related to payload only data, a second token bucket component for metering data bits related to total PDU data, and a third token bucket component for metering data packets.

7. The networked computing system of claim 1, wherein the hybrid rate-limiting scheme comprises a data bit threshold and data packet threshold that are independently set, based on the determined capabilities of a SCD receiving the data communications.

8. A non-transitory computer-readable medium encoded with computer-executable instructions having hybrid rate-limiting scheme instructions, which when executed, performs a method comprising:
    applying a hybrid rate-limiting scheme to data communications provided to a subscriber computing device (SCD) by a service provider device (SPD) over a data communications network, based on at least one of a data bit count and a data packet count.

9. The non-transitory computer-readable medium of claim 8, wherein the hybrid rate-limiting scheme facilitates rate-limiting based on a number of protocol data unit (PDU) data bits counted per unit of time.

10. The non-transitory computer-readable medium of claim 9, wherein the hybrid rate-limiting scheme further concurrently facilitates rate-limiting based on the number of data packets counted per unit of time.

11. The non-transitory computer-readable medium of claim 8, wherein the hybrid rate-limiting scheme further comprises a dual token bucket algorithm that facilitates rate-limiting PDUs in a data transfer queue utilizing a first token bucket component for metering data bits and a second token bucket component for metering data packets.

12. The non-transitory computer-readable medium of claim 11, wherein if the dual token bucket algorithm determines that there are not enough data bit tokens in the first token bucket component or that there are not enough data packet tokens in the second token bucket component, to facilitate transfer of a next PDU in the data transfer queue, the next PDU is held in the data transfer queue until sufficient tokens become available.

13. The non-transitory computer-readable medium of claim 8, wherein the hybrid rate-limiting scheme further comprises a triple token bucket algorithm that facilitates rate-limiting PDUs in a data transfer queue utilizing a first token bucket component for metering data bits related to payload only data, a second token bucket component for metering data bits related to total PDU data, and a third token bucket component for metering data packets.

14. The non-transitory computer-readable medium of claim 8, wherein the hybrid rate-limiting scheme comprises a data bit threshold and data packet threshold that are independently set, based on the determined capabilities of a SCD receiving the data communications.

15. A computer-implemented method employing a hybrid rate-limiting scheme, the method comprising:
    applying a hybrid rate-limiting scheme to data communications provided to a subscriber computing device (SCD) by a service provider device (SPD) over a data communications network, based on at least one of a data bit count and a data packet count.

16. The computer-implemented method of claim 15, wherein the hybrid rate-limiting scheme facilitates rate-limiting based on the number of protocol data unit (PDU) data bits counted per unit of time.

17. The computer-implemented method of claim 16, wherein the hybrid rate-limiting scheme further concurrently facilitates rate-limiting based on the number of data packets counted per unit of time.

18. The computer-implemented method of claim 15, wherein the hybrid rate-limiting scheme further comprises a dual token bucket algorithm that facilitates rate-limiting PDUs in a data transfer queue utilizing a first token bucket component for metering data bits and a second token bucket component for metering data packets.

19. The computer-implemented method of claim 18, wherein if the dual token bucket algorithm determines there are not enough data bit tokens in the first token bucket component to facilitate transfer of a next PDU in the data transfer queue or that there are not enough data packet tokens in the second token bucket component to facilitate transfer of a next PDU in the data transfer queue, the next PDU is held in the data transfer queue until sufficient tokens become available.

20. The computer-implemented method of claim 15, wherein the hybrid rate-limiting scheme comprises a data bit threshold and data packet threshold that are independently set, based on the determined capabilities of a SCD receiving the data communications.

\* \* \* \* \*